(12) United States Patent
Aciicmez et al.

(10) Patent No.: US 7,903,814 B2
(45) Date of Patent: Mar. 8, 2011

(54) ENHANCING THE SECURITY OF PUBLIC KEY CRYPTOSYSTEM IMPLEMENTATIONS

(75) Inventors: Onur Aciicmez, San Jose, CA (US); Jean-Pierre Seifert, Tirol (AT); Qingwei Ma, Fremont, CA (US); Xinwen Zhang, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 893 days.

(21) Appl. No.: 11/828,849

(22) Filed: Jul. 26, 2007

(65) Prior Publication Data
US 2009/0028323 A1    Jan. 29, 2009

(51) Int. Cl.
*H04L 9/00*     (2006.01)
*G06F 11/30*    (2006.01)
(52) U.S. Cl. ............................ 380/30; 380/28; 713/189
(58) Field of Classification Search .................... 380/30, 380/28; 713/189
See application file for complete search history.

(56) References Cited

OTHER PUBLICATIONS

Modified Montgomery modular multiplication and RSA exponentiation techniques; McIvor, C.; McLoone, M.; McCanny, J.V.; Computers and Digital Techniques, IEE Proceedings -; vol. 151 , Issue: 6; Publication Year: 2004 , pp. 402-408.*
Hardware design for end-to-end modular exponentiation in redundant number representation; Sanu, M.O.; Swartzlander, E.E., Jr.; Signal Processing Systems Design and Implementation, 2005. IEEE Workshop on; Publication Year: 2005 , pp. 65-69.*
A New Modular Exponentiation Architecture for Efficient Design of RSA Cryptosystem; Ming-Der Shieh; Jun-Hong Chen; Hao-Hsuan Wu; Wen-Ching Lin; Very Large Scale Integration (VLSI) Systems, IEEE Transactions on vol. 16 , Issue: 9; Publication Year: 2008 , pp. 1151-1161.*
Schindler, W., "A Combined Timing and Power Attack", Proceedings of the 5th International Workshop on Practice and Theory in Public Key Cryptosystems: Public Key Cryptography, Feb. 12-14, 2002. D. Naccache and P. Paillier (Eds.): PKC 2002, LNCS 2274, pp. 263-279, 2002.
Schindler et al., "More Detail for a Combined Timing and Power Attack against Implementations of RSA", 9th IMA International Conferences on Cryptography and Coding, K.G. Paterson (Ed.): Cryptography and Coding 2003, LNCS 2898, pp. 245-263, 2003.
Walter et al., "Distinguishing Exponent Digits by Observing Modular Subtractions", D. Naccache (Ed.): CT-RSA 2001, LNCS 2020, pp. 192{207, 2001.

* cited by examiner

*Primary Examiner* — David Y Jung
(74) *Attorney, Agent, or Firm* — Beyer Law Group LLP

(57) ABSTRACT

In one embodiment, cryptographic transformation of a message is performed by first performing a table initiation phase to populate a data structure. Then, a first random number multiplied by a public key is added to each value in the data structure, in modulo of a second random number multiplied by the public key. Then an exponentiation phase is performed, wherein each modular multiplication and square operation in the exponentiation phase is performed in modulo of the second random number multiplied by the public key, producing a result. Then the result of the exponentiation phase is reduced in modulo of the public key. The introduction of the random numbers aids in the prevention of potential security breaches from the deduction of operands in the table initiation phase by malicious individuals.

20 Claims, 2 Drawing Sheets

ENHANCING THE SECURITY OF PUBLIC KEY CRYPTOSYSTEM IMPLEMENTATIONS

BACKGROUND OF THE INVENTION

1. Field of the Invention

The present invention relates to public-key cryptosystems. More specifically, the present invention relates to enhancing the security of public key cryptosystem implementations.

2. Description of the Related Art

In public-key cryptosystems, a user is given a pair of cryptographic keys—a public key and a private key. Each of these keys may have one or more values/parameters. The private key is kept secret, while the public key may be widely distributed. The keys are related mathematically, but the private key cannot be practically derived from the public key. A message encrypted with the public key can be decrypted only with the corresponding private key. Similarly, a message signed with a private key can be verified using the public key counterpart of this private key.

One of the most widely used types of public-key encryption is RSA. The main operation in RSA is modular exponentiation. For example, the exponentiation may be $P=M^d$ (mod N), wherein M is a message to be decrypted and/or signed, d is the private exponent, which is part of the private key, and N is the public modulus, which is part of the public key. N is usually the product of two large primes p and q, which are parts of the private key. If a malicious user obtains the value of d, he can impersonate the owner of the key and decipher encrypted messages. Other modular exponentiations, such as $M^d$ (mod p), where p is a prime number which is also a factor of the public modulus N may also be used.

Efficent RSA implementations typically use certain exponentiation algorithms which require computing the powers of the input message in a modulus. Then, during an exponentiation phase, these powers are used as operands to the modular operations.

One common technique used in RSA is Montgomery multiplication. Montgomery multiplication includes various modular functions along with a conditional substraction step that depends on the values of the operands. This is known as an extrareduction step. Due to the presence of this extrareduction step, however, it may be possible for statistical analysis to be used to deduce the value of the exponent(s). This leaves software that utilizes RSA implementations vulnerable to attack.

What is needed is a solution that reduces this security risk.

SUMMARY OF THE INVENTION

In one embodiment, cryptographic transformation of a message is performed by first performing a table initiation phase to populate a data structure. Then, a first random number multiplied by a public key is added to each value in the data structure, in modulo of a second random number multiplied by the public key. Then an exponentiation phase is performed, wherein each modular multiplication and square operation in the exponentiation phase is performed in modulo of the second random number multiplied by the public key, producing a result. Then the result of the exponentiation phase is reduced in modulo of the public key. The introduction of the random numbers aids in the prevention of potential security breaches from the deduction of operands in the table initiation phase by malicious individuals.

DETAILED DESCRIPTION OF SPECIFIC EMBODIMENTS

Figure 1:
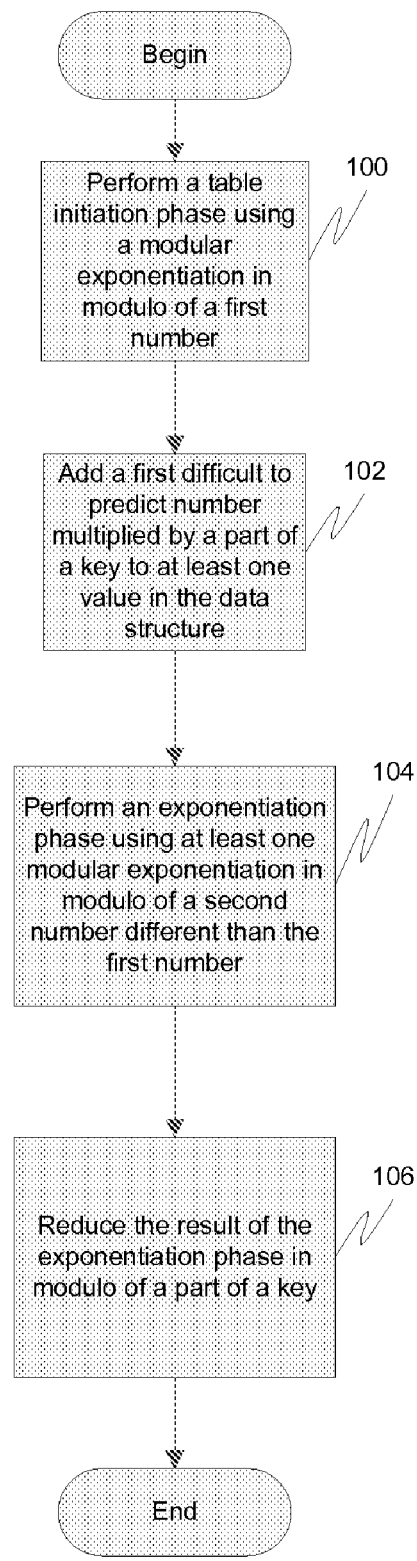
FIG. 1 is a diagram illustrating a method for performing a cryptographic transformation of a message in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, additional operations are added before the exponentiation phase. These additional operations transform the values of the powers in the original modulus into different values in a modified modulus.

Given the inputs M, d, and N (representing the message, exponent, and modulus, respectively), a typical RSA implementation typically performs the modular exponentiation ($M^d$ mod N) in the following way:

1. Table Initialization Phase
   In this phase, the powers of M are computed in mod N and the results stored in a table. More precisely, the following computations are performed:

$e_1 = (M \bmod N), e_2 = (M^2 \bmod N), e_3 = (M^3 \bmod N), \ldots, e_t = (M^t \bmod N)$ where the value of t depends on the exact exponentiation process used in the implementation.

2. Exponentiation Phase
   In this phase, the exponent d is parsed into small windows and a sequence of modular multiplication and square operations is performed based on the values of these windows.

The RSA implementation of OpenSSL, which is the most widely used open source cryptographic library, employs two different exponentiation algorithms depending on the user choice: sliding window and fixed window. In the fixed window exponentiation method, the n-bit exponent d is considered to be in radix-$2^b$ form, i.e., $d=(d_0, d_1, \ldots, d_{k-1})2^b$, where $n=k*b$. For purposes of illustration, an example of the present invention using a fixed window implementation will be described. However, one of ordinary skill in the art will recognize that the present invention may be implemented using any type of exponentiation process and/or public key cryptosystem implementation.

Below is example pseudocode for a fixed window exponentiation method.

```
e₁ = M
for     i from 2 to 2^b - 1
        e_i = e_{i-1} * M (mod N)
S = e_{d0}
for     i from 1 to k - 1
        S = S^{2^b} (mod N)
        if d_i ≠ 0 then
            S = S * e_{d_i} (mod N)
return S
```

As can be seen, the same $e_i$ values are used as operands during the table initialization phase (the first for-loop) as during the exponentiation phase (the second for-loop). In an embodiment of the present invention, different multiplication operands are used for each of the phases while the overall process still computes the same correct end result.

In one embodiment, two numbers r1 and r2 are selected, wherein r2 may be larger than r1. These numbers may be difficult to predict. This may be accomplished by, for example, making one or both of them random or pseudorandom. Alternatively, these random numbers may be selected from a list of numbers, with the numbers cycling through the list. The numbers themselves may be altered after each computation, or each phase, or each cryptographic process. Alternatively, the numbers may be fixed for a period of time or a number of computations, phases, or processes before being changed.

After the table initialization phase, r1*N is added to each $e_i$ value in mod r2*N. Then during the exponentiation phase, the same operation sequence may be utilized except that each modular multiplication and square operation is performed in modulus r2*N instead of N. At the end of the exponentiation phase, the result is then reduced in mod N. Below is example pseudocode for this embodiment in a fixed window exponentiation method.

```
e₁ = M
for     i from 2 to 2^b - 1
        e_i = e_{i-1} * M (mod N)
for     i from 1 to 2^b - 1
        e_i = e_i + r1 * N (mod r2 * N)
S = e_{d0}
for     i from 1 to k - 1
        S = S^{2^b} (mod r2 * N)
        if d_i ≠ 0 then
            S = S * e_{d_i} (mod r2 * N)
return S (mod N)
```

In another embodiment, only one number r1 is selected. As before, this number may be random or otherwise difficult to predict. During the table initiation phase, operations are computed in r1 * N. Then, after the table initiation phase, the values are reduced in modulo N without using the Montgomery algorithm. During the exponentiation phase, the modular multiplications are performed in the regular modulus N. Below is example pseudocode for this embodiment in a fixed window exponentiation method.

```
e₁ = M
for     i from 2 to 2^b - 1
        e_i = e_{i-1} * M (mod r1 * N)
for     i from 2 to 2^b - 1
        e_i = e_i (mod N)
S = e_{d0}
for     i from 1 to k - 1
        S = S^{2^b} (mod N)
        if d_i ≠ 0 then
            S = S * e_{d_i} (mod N)
return S (mod N)
```

It should be noted that the term "message" as used throughout this document is a standard cryptographic term used to refer to the input upon which a cryptographic algorithm is applied and the output derived from application of the cryptographic algorithm. For example, the input message may be encrypted by a cryptographic algorithm, resulting in an encrypted message. The encrypted message may then be decrypted by a cryptographic algorithm, resulting in a decrypted message. The term message, however, should not be construed to apply only to textual information but may, in fact, refer to any type of input that can be encrypted or decrypted, including, for example, numerical information, audio, still image, and video information, among others.

The present invention can be applied to many different technologies that rely upon cryptographic processes. This includes, for example, digital rights management, virtual private networks, digital signatures, etc.

FIG. 1 is a flow diagram illustrating a method for performing a cryptographic transformation of a message in accordance with an embodiment of the present invention. It should be noted that the transformation may be either an encryption or a decryption. The message may be textual, numerical, binary, an ordered sequence of bits, a portion of a video, a portion of an audio file, a digital certificate, or any other type of message or any combination thereof. At 100, a table initiation phase is performed using a modular exponentiation in modulo of a first number. This may populate a data structure with the results of the table initiation phase. At 102, a first difficult to predict number, multiplied by a part of a key, may be added to at least one value in the data structure. Difficult to predict shall be interpreted to mean a random, pseudo-random, or other number that one of ordinary skill in the art would find difficult to predict. The purpose of this number is so that a would-be interceptor of the message would find it difficult to perform the cryptographic transformation. As such, the goal is to make the number difficult for this would-be interceptor to predict, and the difficulty required to predict such a number shall be measured by the level of an interceptor of ordinary skill.

At 104, an exponentiation phase is performed using at least one modular exponentiation in modulo of a second number different than the first number. At 106, the result of the exponentiation phase may be reduced in modulo of a part of a key.

Figure 2:
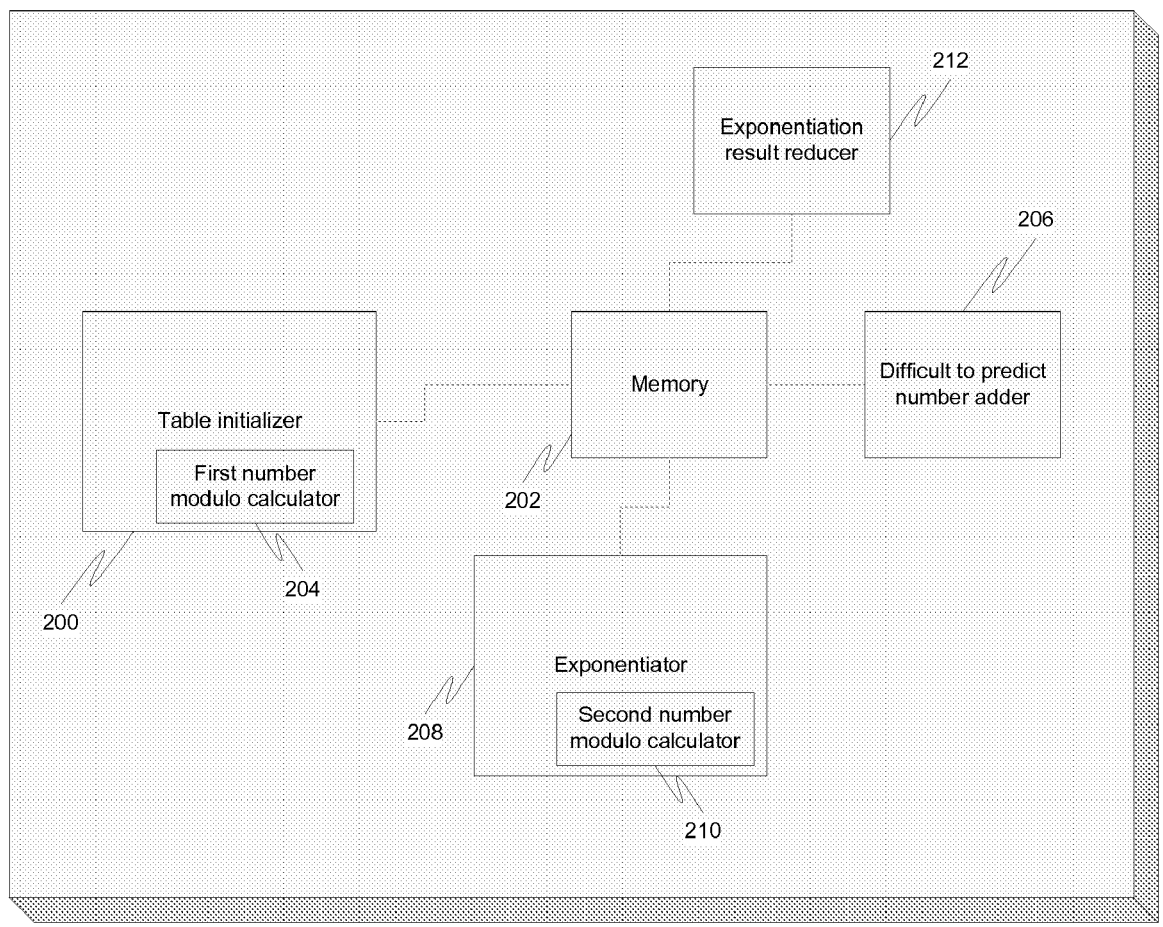
FIG. 2 is a diagram illustrating an apparatus for performing a cryptographic transformation of a message in accordance with another embodiment of the present invention.

FIG. 2 is a block diagram illustrating an apparatus for performing a cryptographic transformation of a message in accordance with an embodiment of the present invention. As with the method above, it should be noted that the transformation may be either an encryption or a decryption. The message may be textual, numerical, binary, an ordered sequence of bits, a portion of a video, a portion of an audio file, a digital certificate, or any other type of message or any combination thereof. A table initializer 200 coupled to a memory 202 may perform a table initiation phase using a modular exponentiation in modulo of a first number, storing the results in the memory 202. This may populate a data structure with the results of the table initiation phase. The table initializer 200 may include a first number modulo calculator 204 to perform at least a portion of the modular exponentiation. A difficult to predict number adder 206 coupled to the memory 202 may add a first difficult to predict number, multiplied by a part of a key, to at least one value in the data structure. Difficult to predict shall be interpreted to mean a random, pseudo-random, or other number that one of ordinary skill in the art would find difficult to predict. The purpose of this number is so that a would-be interceptor of the message would find it difficult to perform the cryptographic transformation. As such, the goal is to make the number difficult for this would-be interceptor to predict, and the difficulty required to predict such a number shall be measured by the level of an interceptor of ordinary skill.

An exponentiator 208 coupled to the memory 202 may perform an exponentiation phase is performed using at least one modular exponentiation in modulo of a second number different than the first number. The exponentiator 208 may include a second number modulo calculator 210 to perform at least a portion of the modular exponentiation. An exponentiation result reducer 212 coupled to the memory 202 may reduce the result of the exponentiation phase in modulo of a part of a key.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for performing a cryptographic transformation of a non-transitory digital communication message, the method comprising:
    performing a table initiation phase using a modular exponentiation in modulo of a first number;
    performing an exponentiation phase using at least one modular exponentiation in modulo of a second number different than the first number; and
    encrypting or decrypting the non-transitory digital communication message based on results of the exponentiation phase.

2. The method of claim 1, wherein the performing a table initiation phase includes populating a data structure and wherein the method further comprises:
    adding a first difficult to predict number, multiplied by a part of a key, to at least one value in the data structure.

3. The method of claim 2, wherein the first difficult to predict number is a random number.

4. The method of claim 1, wherein the first number is a part of a key and the second number is not part of a key.

5. The method of claim 1, wherein the performing a table initiation phase includes:
    computing one or more powers of the non-transitory digital communication message in modulo of a part of a key; and
    storing the computed powers in a data structure.

6. The method of claim 1, further comprising performing a step from the group consisting of:
    displaying the non-transitory digital communication message on a display;
    displaying an end result of and/or an intermediate result calculated during the method on a display; and
    passing an end result of and/or an intermediate result calculated during the method to an application.

7. The method of claim 1, wherein the non-transitory digital communication message is a combination of at least one of the following:
    a textual message;
    a numerical value;
    a portion of a binary file;
    an ordered sequence of bits;
    a portion of a video;
    a portion of an audio file; and
    a digital certificate.

8. The method of claim 1, further comprising:
    reducing the result of the exponentiation phase in modulo of a part of a key.

9. An apparatus for performing a cryptographic transformation of a non-transitory digital communication message, the apparatus comprising:
    a table initializer including a first number modulo calculator;
    an exponentiator including a second number modulo calculator, wherein the exponentiator is coupled to the table initializer; and
    an encrypter/decrypter coupled to the exponentiator.

10. The apparatus of claim 9, further comprising:
    an exponentiation result reducer coupled to the exponentiator.

11. The apparatus of claim 9, further comprising:
    a difficult to predict number adder coupled to the memory.

12. An apparatus for performing a cryptographic transformation of a non-transitory digital communication message, the apparatus comprising:
    means for performing a table initiation phase using a modular exponentiation in modulo of a first number;
    means for performing an exponentiation phase using at least one modular exponentiation in modulo of a second number different than the first number; and
    means for encrypting or decrypting the non-transitory digital communication message based on results of the exponentiation phase.

13. The apparatus of claim 12, wherein the means for performing a table initiation phase includes means for populating a data structure and wherein the apparatus further comprises:
    means for adding a first difficult to predict number, multiplied by a part of a key, to at least one value in the data structure.

14. The apparatus of claim 13, wherein the first difficult to predict number is a random number.

15. The apparatus of claim 12, wherein the first number is a part of a key and the second number is not part of a key.

16. The apparatus of claim 12, wherein the means for performing a table initiation phase includes:
    means for computing one or more powers of the message in modulo of a part of a key; and
    means for storing the computed powers in a data structure.

17. The apparatus of claim 12, further comprising a component selected from the group consisting of:
    means for displaying the message on a display;
    means for displaying an end result of and/or an intermediate result calculated during the method on a display; and
    means for passing an end result of and/or an intermediate result calculated during the method to an application.

18. The apparatus of claim 12, wherein the message is a combination of at least one of the following:
   a textual message;
   a numerical value;
   a portion of a binary file;
   an ordered sequence of bits;
   a portion of a video;
   a portion of an audio file; and
   a digital certificate.

19. The apparatus of claim 12, further comprising:
   means for reducing the result of the exponentiation phase in modulo of a part of a key.

20. A program storage device readable by a machine tangibly embodying a program of instructions executable by the machine to perform a method for performing a cryptographic transformation of a non-transitory digital communication message, the method comprising:
   performing a table initiation phase using a modular exponentiation in modulo of a first number;
   performing an exponentiation phase using at least one modular exponentiation in modulo of a second number different than the first number; and
   encrypting or decrypting the non-transitory digital communication message based on results of the exponentiation phase.

* * * * *